(12) United States Patent
Liu et al.

(10) Patent No.: US 9,857,454 B1
(45) Date of Patent: Jan. 2, 2018

(54) ADAPTIVE DOPPLER FILTER RE-OPTIMIZATION METHOD FOR PULSED INTERFERENCE COUNTERMEASURE

(71) Applicant: THALES-RAYTHEON SYSTEMS COMPANY LLC, Fullerton, CA (US)

(72) Inventors: Sien-Chang C. Liu, Brea, CA (US); Jih-Fang A. Liu, Brea, CA (US)

(73) Assignee: Raytheon Command And Control Solutions LLC, Fullerton, CA (US)

( * ) Notice: Subject to any disclaimer, the term of this patent is extended or adjusted under 35 U.S.C. 154(b) by 365 days.

(21) Appl. No.: 14/748,708

(22) Filed: Jun. 24, 2015

(51) Int. Cl.
*G01S 7/292* (2006.01)

(52) U.S. Cl.
CPC .................. *G01S 7/292* (2013.01)

(58) Field of Classification Search
CPC ........................................... G01S 7/292
USPC ............................................. 342/159
See application file for complete search history.

(56) References Cited

U.S. PATENT DOCUMENTS

| 3,267,465 A | 8/1966 | Cuthbert |
| 3,911,432 A | 10/1975 | Williams |
| 4,010,468 A | 3/1977 | Fishbein et al. |
| 5,115,246 A | 5/1992 | Thomas, Jr. et al. |
| 5,317,320 A | 5/1994 | Grover et al. |
| 7,375,676 B1 | 5/2008 | Loberger |

OTHER PUBLICATIONS

Quan et al., "OTHR Spectrum Reconstruction of Maneuvering Target with Compressive Sensing," Hindawi Publishing Corporation, International Journal of Antennas and Propagation, 10 pages, 2014.
Turley, "Impulsive Noise Rejection in HF Radar Using a Linear Prediction Technique," IEEE, pp. 358-362, 2003.

*Primary Examiner* — Tashiana Adams
*Assistant Examiner* — Helena Seraydaryan
(74) *Attorney, Agent, or Firm* — Lewis Roca Rothgerber Christie LLP

(57) ABSTRACT

A range-gated Doppler radar configured to mitigate the effects of pulsed interference. A Doppler filter is constructed using a vector of weights, the vector of weights being calculated as the matrix product of (i) the inverse of an reduced overall covariance matrix and (ii) a reduced progressive phasor vector. The reduced overall covariance matrix is formed by deleting from an overall covariance matrix rows and columns corresponding to pulses corrupted by pulsed interference. The reduced progressive phasor vector is formed by deleting from a progressive phasor vector elements corresponding to pulses corrupted by pulsed interference. The elements of the progressive phasor vector have constant modulus and the phase of the elements changes linearly within the vector. The overall covariance matrix is a weighted sum of an identity matrix and several specific covariance matrices, that may represent distributed clutter with positive velocity, distributed clutter with negative velocity, and ground clutter.

17 Claims, 15 Drawing Sheets

ADAPTIVE DOPPLER FILTER RE-OPTIMIZATION METHOD FOR PULSED INTERFERENCE COUNTERMEASURE

BACKGROUND

1. Field

One or more aspects of embodiments according to the present invention relate to radar systems, and more particularly to a system and method for mitigating the effects of pulsed interference in a radar system.

2. Description of Related Art

Tactical ground radars and over-the-horizon radars (OTHR) may experience high magnitude natural and man-made pulsed interfering signals or analog-to-digital converter saturation. For multiple mobile radar systems or where frequency congestion makes the assignment of different operating frequencies difficult, pulsed interference between radar systems may be difficult to avoid and may result in missing target detection or tracking. Although only one pulse return may be affected in the time domain, if no steps are taken to mitigate the effect of the interference the noise level in an entire Doppler filter bank may rise above the real target signal level and degrade detection performance. Multiple pulsed interferers can make signal detection still more difficult. It may be possible to detect and to blank pulsed interference in the time domain to prevent its propagation in the frequency domain. The excision of even one pulse return from the data, however, may significantly degrade a clutter cancellation mechanism. For example, the response of Doppler filters designed to cancel ground clutter may be changed to an unacceptable degree by the simple excision of a pulse return from the data, and unacceptable ground clutter leakage may result.

Prediction techniques based on interpolation and extrapolation algorithms using data from unaffected pulses may be used to replace the missing pulse data. Using prediction methods some reduction of the clutter return in the Doppler filters may be achieved, but the residual clutter may nonetheless not be acceptable. Radar synchronization between multiple radars may be effective to eliminate pulsed interference is available, but this approach may be incompatible with the operation of a radar search mode and may be infeasible for situations involving multiple mobile radars.

Thus, there is a need for a system and method of mitigating pulsed interference in a radar system.

SUMMARY

Aspects of embodiments of the present disclosure are directed toward a range-gated Doppler radar configured to mitigate the effects of pulsed interference. A Doppler filter is constructed using a vector of weights, the vector of weights being calculated as the matrix product of (i) the inverse of a reduced overall covariance matrix and (ii) a reduced progressive phasor vector. The reduced overall covariance matrix is formed by deleting from an overall covariance matrix rows and columns corresponding to pulses corrupted by pulsed interference. The reduced progressive phasor vector is formed by deleting from a progressive phasor vector elements corresponding to pulses corrupted by pulsed interference. The elements of the progressive phasor vector have constant modulus and the phase of the elements changes linearly within the vector. The overall covariance matrix is a weighted sum of an identity matrix and several specific covariance matrices, that may represent distributed clutter with positive velocity, distributed clutter with negative velocity, and ground clutter.

According to an embodiment of the present invention there is provided a method for operating a range-gated Doppler radar in the presence of pulsed interference, the method including: receiving, with a radar antenna, reflected radar radiation; processing the received reflected radar radiation with a radar front-end processor to form a return vector, the return vector being a vector of range-gated radar returns; identifying the index k of an element, of the return vector, corrupted by pulsed interference; forming a first reduced progressive phasor vector, equal to the result of removing at least the $k^{th}$ element from a first full progressive phasor vector, the first full progressive phasor vector being a vector of complex numbers, the arguments of the elements of the first full progressive phasor vector being a linear function of their respective positions in the first full progressive phasor vector, the linear function having a slope proportional to a center frequency of a first Doppler filter; forming a reduced-rank overall covariance matrix equal to the result of removing at least the $k^{th}$ row and at least the $k^{th}$ column from a full-rank overall covariance matrix, the full-rank overall covariance matrix being equal to an identity matrix plus a weighted sum of one or more specific covariance matrices including a specific covariance matrix for ground clutter; and calculating a first reduced vector of weights for the first Doppler filter, the matrix product of the reduced overall covariance matrix and the first reduced vector of weights being equal to the first reduced progressive phasor vector.

In one embodiment, the method includes multiplying the first reduced vector of weights, in a dot product, by a reduced return vector, the reduced return vector being equal to the result of removing at least the $k^{th}$ element from the return vector.

In one embodiment, the method includes forming a full vector of weights by inserting a zero element in the first reduced vector of weights at each of one or more positions corresponding to positions at which elements were removed from the first full phasor vector to form the first reduced phasor vector.

In one embodiment, the method includes multiplying the full vector of weights, in a dot product, by the return vector.

In one embodiment, the method includes forming a normalized reduced vector of weights proportional to the first reduced vector of weights, the sum of the squares of the moduli of the elements of the normalized reduced vector of weights being equal to a set constant.

In one embodiment, all elements of the first full phasor vector have the same modulus.

In one embodiment, all elements of the first full phasor vector have a modulus of 1.

In one embodiment, the method includes: forming a second reduced progressive phasor vector, equal to the result of removing at least the $k^{th}$ element from a second full progressive phasor vector, the second full progressive phasor vector being a vector of complex numbers, the arguments of the elements of the second full progressive phasor vector being a linear function of their respective positions in the second full progressive phasor vector, the linear function having a slope proportional to a center frequency of a second Doppler filter; and calculating a second reduced vector of weights for the second Doppler filter, the matrix product of the reduced overall covariance matrix and the second reduced vector of weights being equal to the second reduced progressive phasor vector.

In one embodiment, the calculating of the first reduced vector of weights includes calculating the inverse of the reduced overall covariance matrix.

In one embodiment, the calculating of the inverse of the reduced overall covariance matrix includes forming a lower-upper (LU) decomposition of the reduced overall covariance matrix.

In one embodiment, the overall covariance matrix is equal to the weighted sum of: an identity matrix; a first specific covariance matrix; a second specific covariance matrix; and a third specific covariance matrix, wherein the first specific covariance matrix, the second specific covariance matrix, and the third specific covariance matrix are weighted with a first tuning parameter, a second tuning parameter, and a third tuning parameter, respectively.

In one embodiment, the first specific covariance matrix corresponds to distributed clutter with positive velocity; the second specific covariance matrix corresponds to distributed clutter with negative velocity; and the third specific covariance matrix corresponds to ground clutter.

According to an embodiment of the present invention there is provided a range-gated Doppler radar system including: a radar antenna; a radar transmitter connected to the radar antenna; a radar receiver connected to the radar antenna; and a processing module connected to the radar receiver and configured to: receive, from the receiver, a return vector, the return vector being a vector of range-gated radar returns; identify the index k of an element, of the return vector, corrupted by pulsed interference; form a first reduced progressive phasor vector, equal to the result of removing at least the $k^{th}$ element from a first full progressive phasor vector, the first full progressive phasor vector being a vector of complex numbers, the arguments of the elements of the first full progressive phasor vector being a linear function of their respective positions in the first full progressive phasor vector, the linear function having a slope proportional to a center frequency of a first Doppler filter; form a reduced-rank overall covariance matrix equal to the result of removing at least the $k^{th}$ row and at least the $k^{th}$ column from a full-rank overall covariance matrix, the full-rank overall covariance matrix being equal to an identity matrix plus a weighted sum of one or more specific covariance matrices including a specific covariance matrix for ground clutter; and calculate a first reduced vector of weights for the first Doppler filter, the matrix product of the reduced overall covariance matrix and the first reduced vector of weights being equal to the first reduced progressive phasor vector.

In one embodiment, the processing module is further configured to multiply the first reduced vector of weights, in a dot product, by a reduced return vector, the reduced return vector being equal to the result of removing at least the $k^{th}$ element from the return vector.

In one embodiment, all elements of the first full progressive phasor vector have the same modulus.

In one embodiment, all elements of the first full progressive phasor vector have a modulus of 1.

In one embodiment, the processing module is further configured to: form a second reduced progressive phasor vector, equal to the result of removing at least the $k^{th}$ element from a second full progressive phasor vector, the second full progressive phasor vector being a vector of complex numbers, the arguments of the elements of the second full progressive phasor vector being a linear function of their respective positions in the second full progressive phasor vector, the linear function having a slope proportional to a center frequency of a second Doppler filter; and calculate a second reduced vector of weights for the second Doppler filter, the matrix product of the reduced overall covariance matrix and the second reduced vector of weights being equal to the second reduced progressive phasor vector.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an adaptive Doppler filter re-optimization method for pulsed interference counter measure provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
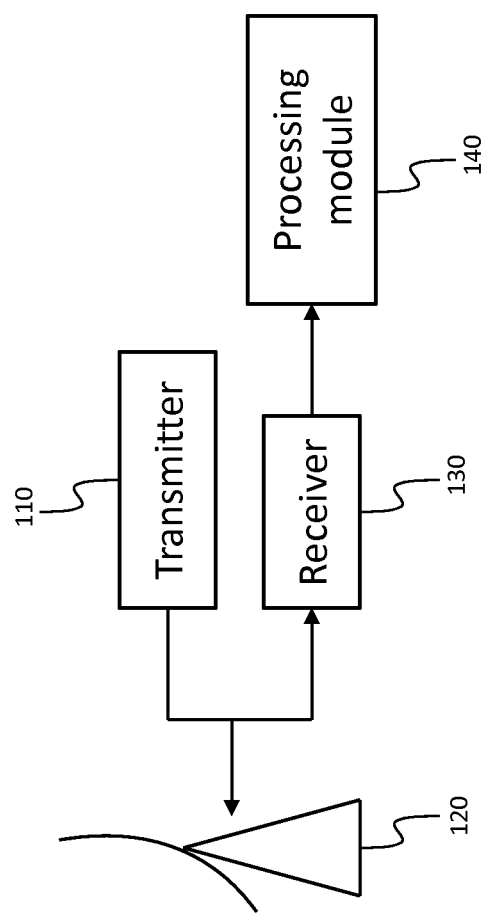
FIG. 1 is a block diagram of a range-gated Doppler radar system according to an embodiment of the present invention.

Referring to FIG. 1, in one embodiment a pulsed range-gated radar points in a particular direction, and transmits, from a transmitter 110, and through a radar antenna 120, a sequence of pulses during a time interval referred to as a dwell. Each pulse may be reflected from one or more targets, and the reflections, or "radar returns" are received through the radar antenna, by a receiver 130, which may amplify and filter the returns, and which may perform frequency conversion and conversion to digital format. The receiver may also have a range-gating function. For example, after a pulse is transmitted, the receiver may amplify the received signal, perform a frequency conversion to an intermediate frequency or to baseband, and sample the intermediate frequency with an A/D converter at a first (relatively high) data rate. In another embodiment, band-pass filtering and downsampling may be used to similar effect. The samples at the first data rate are then averaged or otherwise digitally filtered to produce samples at a second (lower) data rate. Each of the lower data rate samples may be referred to as the output of a range gate, because each corresponds to a time interval after transmission of a pulse, and because the time between transmission of the pulse and receipt of the return from a target corresponds to a range to the target.

In one embodiment, described herein only as one example, the system operates with 500 range gates, i.e., 500 samples of the radar return signal are collected after each transmitted pulse. Each sample is a complex number corresponding to an in-phase component and a quadrature components of the return signal. Moreover, in one embodiment, 20 pulses are transmitted (and the corresponding returns processed), within each dwell. In other embodiments the number of range gates may be greater or smaller than 500, and the number of pulses per dwell may be greater or smaller than 20, and may or may not be equal to the number of range gates.

Within each range gate, there are therefore a number of samples, one sample for each pulse in the dwell. These samples may be arranged to form a vector or "return vector", e.g., a vector of 20 complex numbers. This return vector may be an output of the receiver 130 and may be fed into a processing module 140 for further processing. In the processing module 140, a plurality of Doppler filters may be applied to the return vector. Each Doppler filter may be applied by taking the dot product of the return vector and a vector of complex weights, or corresponding to the Doppler filter. The vector of weights may be selected to provide a band-pass as a function of Doppler frequency, which may be proportional to a range rate.

A particular Doppler filter may have a peak response at the center frequency of the Doppler filter, and it may also have a non-zero response for other frequencies. If not sufficiently small, this out of band response may degrade the performance of the system. For example the Doppler filter may have a non-zero response for Doppler frequencies near 0, i.e., near DC, and the radar returns may have a strong signal at these Doppler frequencies because of reflections from the ground or "ground clutter". Thus, each Doppler filter may be designed to have a highly attenuated response at frequencies near DC, to prevent the signal from ground clutter from contaminating or overwhelming the signal from a target of interest.

Figure 2A:
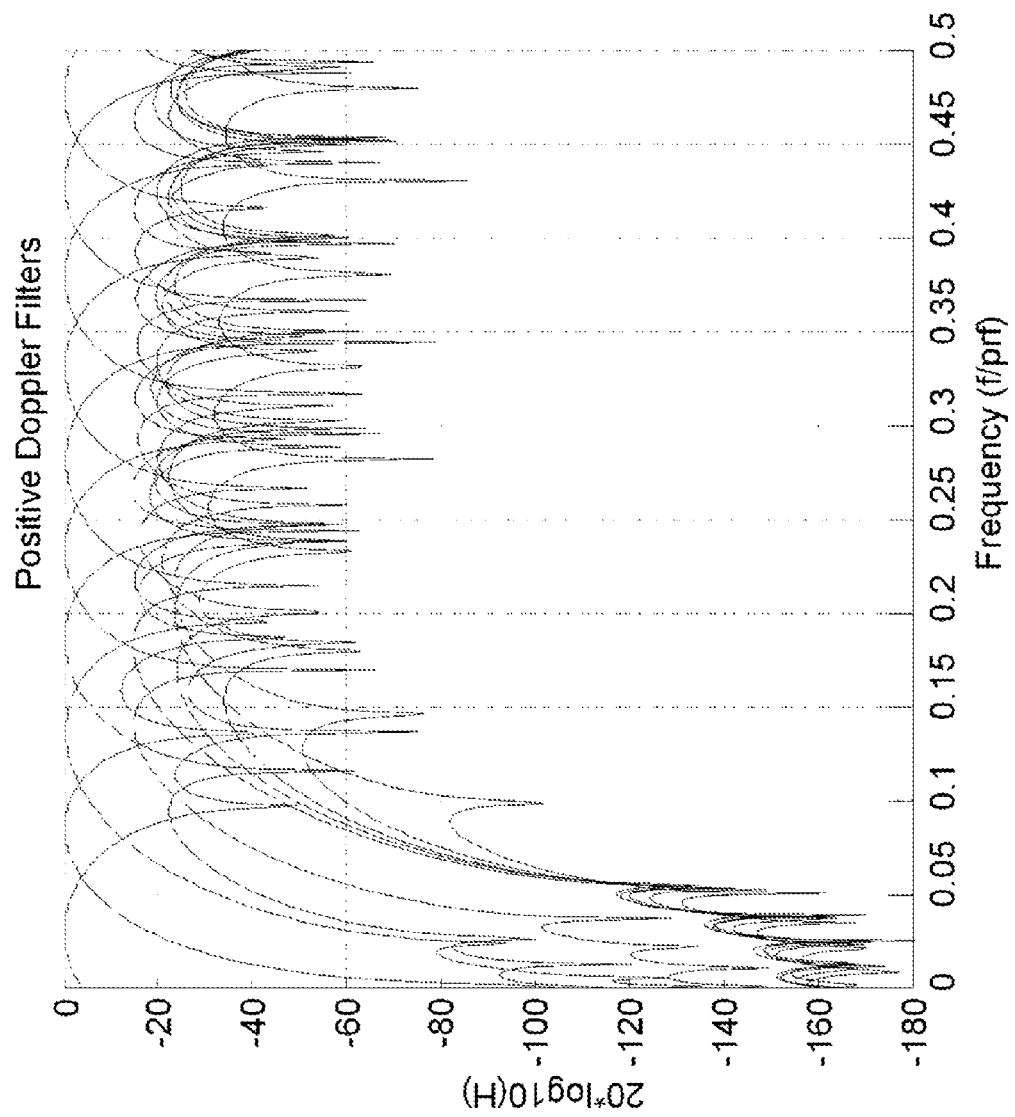
FIG. 2A is a graph of the frequency responses of filters in a bank of Doppler filters according to an embodiment of the present invention.

Referring to FIG. 2A, in one embodiment, a bank of Doppler filters may have the frequency responses shown. All except the first Doppler filter (i.e., the positive number 1 Doppler filter, with a center frequency that is approximately 0.03 times the pulse repetition frequency) have a significantly attenuated response at and near DC, i.e., all of these filters exhibit significant ground clutter cancellation. The bank of filters corresponds to positive Doppler frequencies (corresponding, e.g., to negative range rates); a second bank of filters with symmetric shapes for negative Doppler frequencies may be used as well, for example to be able also to detect targets with positive range rates.

Figure 2B:
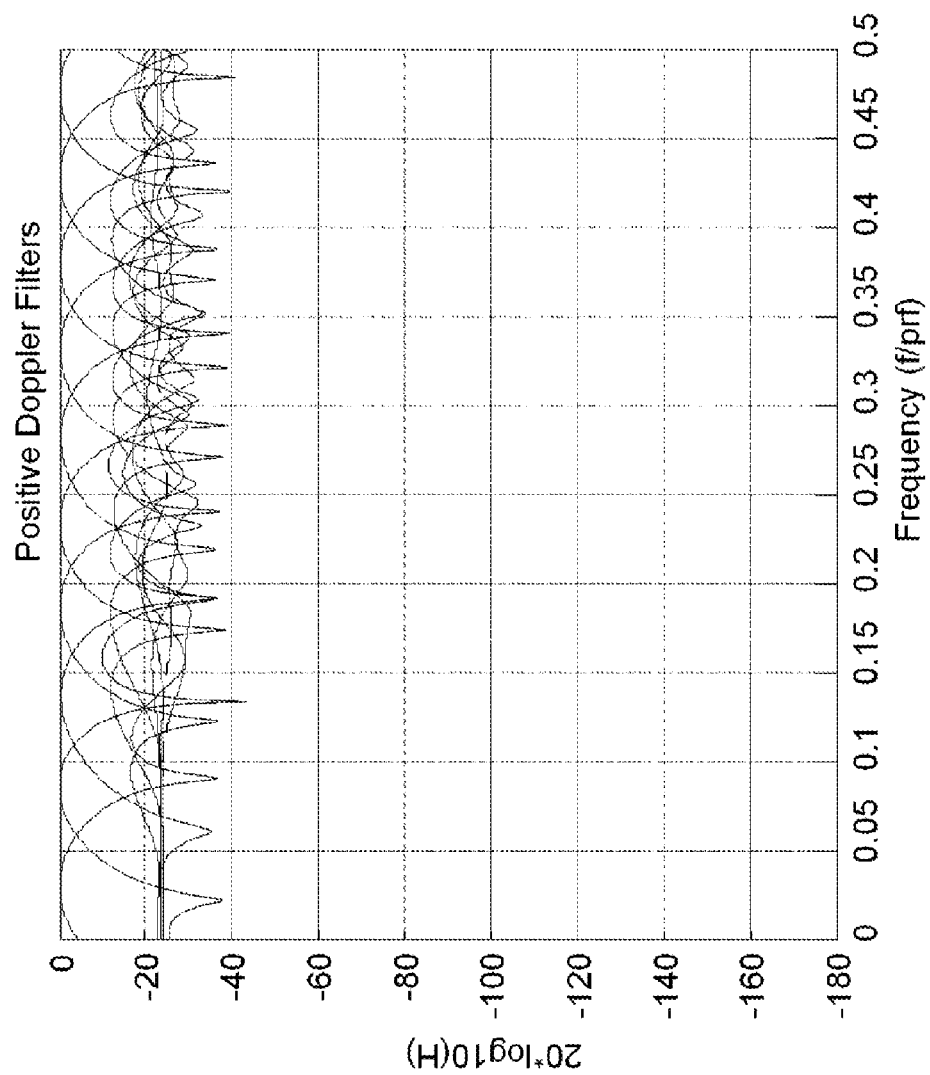
FIG. 2B is a graph of the frequency responses of filters in a bank of Doppler filters according to an embodiment of the present invention.

If pulsed interference corrupts on of the elements of the return vector, i.e., renders the element of the return vector meaningless, it is possible to exclude its contribution when forming the dot product for a Doppler filter, e.g., by removing the corrupted element from the return vector to form a reduced return vector (having one fewer element than the return vector) and taking the dot product of this vector with a reduced vector of weights, formed by removing from the vector of weights the corresponding element. However in general the result of this operation may not have acceptable, or even significant, ground clutter cancellation. FIG. 2B shows the effect of setting to zero the $11^{th}$ weight of the positive number 2 filter without re-calculating the weights; it is apparent that the ground clutter cancellation is largely lost.

Clutter may be present due to other mechanisms, such as rain. Each source of clutter may be characterized by a power spectrum, from which may be derived, as will be understood by one of skill in the art, a covariance matrix.

In one embodiment, a method of calculating a vector of weights generates weights with acceptable ground clutter cancellation even when a reduced return vector, from which one or more elements have been removed, is the input to the filter. To derive an equation for the Doppler weights, the following cost function is defined:

$$C = \mu_1(\underline{W} - \underline{W}_o)^{*T}(\underline{W} - \underline{W}_o) + \mu_2 \underline{W}^{*T} R_{dp} \underline{W} + \mu_3 \underline{W}^{*T} R_{dn} \underline{W} + \mu_4 \underline{W}^{*T} R_g \underline{W}$$

where the first term is to minimize weight perturbation (i.e., if the first term were the only term present, the behavior of the filter bank would approximate that of a Fourier transform), $R_{dp}$ is the covariance matrix for distributed clutter with positive velocity, $R_{dn}$ is the covariance matrix for distributed clutter with negative velocity, and $R_g$ is the covariance matrix for ground clutter.

$\underline{W}_o$ is a vector specific to the Doppler filter, referred to herein as a progressive phasor vector, in which each element has the same modulus (e.g., each element has modulus 1) and in which the phase changes by a constant amount from element to element (i.e., the phase is a linear function of position within the progressive phasor vector), with the phase change from element to element being proportional to the center frequency of the Doppler filter (i.e., with the slope of the linear function being proportional to the center frequency of the Doppler filter). For example each element $\underline{W}_{oi}$ of the progressive phasor vector $\underline{W}_o$ may be given by $\underline{W}_{oi} = \exp(j*(-2*pi*fprf*i))$ (as in Listing 1, below), where j is the square root of −1, fprf is a constant specifying the phase change from element to element and i is the index of the element. The constant fprf may be equal to the ratio of (i) the center frequency of the Doppler filter to (ii) the pulse repetition frequency.

To derive an equation for the vector of optimum weights W for the Doppler filter, the derivative dC/dW is set to zero. From dC/dW=0 it follows that $$2\mu_1(\underline{W} - \underline{W}_o) + 2\mu_2 R_{dp}\underline{W} + 2\mu_3 R_{dn}\underline{W} + 2\mu_4 R_g\underline{W} = 0$$

This is solved for the vector of optimum weights W, which can be expressed as:

$$\underline{W} = \mu_1 + (\mu_1 I + \mu_2 R_{dp} + \mu_3 R_{dn} + \mu_4 R_g)^{-1} \underline{W}_o = R^{-1} \underline{W}_o, \quad (1)$$

where the overall covariance matrix R is given by:

$$R=(1/\mu_1)*(\mu_1 I+\mu_2 R_{dp}+\mu_3 R_{dn}+\mu_4 R_g)$$

The above derivation does not depend on the return vector containing a set of samples equally spaced in time, and can therefore be used with a return vector from which samples corrupted by pulsed interference have been excised (referred to herein as a "reduced return vector"), to find a reduced vector of weights (i.e., a vector of weights from which the corresponding elements are absent).

The spectra, and the covariance matrices, of the ground clutter, the distributed clutter with positive velocity, and the distributed clutter with negative velocity may depend on various factors. The location of the radar may affect the covariance matrices, because, for example, the spectrum of ground clutter near the ocean, where radar may be reflected from moving waves, may be different from that in the desert. Distributed ground clutter may be the result of radar reflecting from rain, and the corresponding covariance matrices may therefore depend on the frequency of rain at the location of the radar, the statistics of wind speed and direction, and the pointing direction of the radar.

In one embodiment the calculation of the weights according to Equation 1 may be performed sufficiently quickly to be completed at the same rate as the rate at which data are obtained. For example for a system operating with 20 pulses per dwell and a pulse repetition frequency of 10 kHz, the inter-pulse period may be 100 microseconds, and the time for each dwell may be 2 ms. It may be possible to invert the overall covariance matrix R in a time interval of 130 microseconds or less on average. In this case it may be possible to calculate several such inverses during each dwell.

In the equations above, the tuning parameters $\mu_2$, $\mu_3$, and $\mu_4$ may be adjusted to meet requirements for ground clutter cancellation, and for cancellation of distributed clutter with positive velocity and of distributed clutter with negative velocity. As may be seen from Equation 1, increasing all four tuning parameters $\mu_1$, $\mu_2$, $\mu_3$, and $\mu_4$ has no effect on the solution for the weights. Thus $\mu_1$ may, without loss of generality, be set to 1. In this case, increasing $\mu_2$ will result in greater ground clutter cancellation, increasing $\mu_3$ will result in greater cancellation of distributed clutter with positive velocity, and increasing $\mu_4$ will result in greater cancellation of distributed clutter with negative velocity. Different values of the tuning parameters may be used in different situations. For example, the positive number 1 filter in the bank (i.e., the filter with the lowest frequency peak in FIG. 2A) may have weights calculated with $\mu_4=0$, because significant ground clutter cancellation may not be achievable for a filter with a peak so close to DC (i.e., so close to zero range rate). As a result the output of this filter may not be useful when the antenna as pointed sufficiently close to the horizon that ground clutter is large; it may, however, be useful if the antenna is pointed with an elevation well above the horizon.

Accordingly, a system may calculate the inverse of the overall covariance matrix R several times per dwell, with different values of the tuning parameters for different filters. For example, as suggested above, a set of tuning parameters with $\mu_4=0$ may be used when calculating the weights for the positive number 1 filter, and a set of tuning parameters with $\mu_2$, $\mu_3$, and $\mu_4=0$ all different from zero may be used when calculating the weights for the positive number 10 filter in the bank. In one embodiment, the filters are divided into four groups, each having a set of tuning parameters, and the overall covariance matrix is calculated and inverted once for each of the four groups.

In one embodiment the tuning parameters, or the covariance matrices, or both, may be adjusted in real time to correspond to the current weather or the current pointing direction of the antenna. In one embodiment the covariance matrices for distributed clutter are derived from a model based on the mean rain range rate (which may be calculated from the wind speed, the terminal velocity of the rain drops, and the current pointing direction of the antenna). In a simpler embodiment the tuning parameters $\mu_2$ and $\mu_3$, or the corresponding covariance matrices, may be interchanged depending on whether the antenna is pointing upwind or downwind. In another embodiment a set of covariance matrices corresponding to different weather conditions and antenna pointing angles is stored and a subset (of three covariance matrices, one covariance matrix for distributed clutter with positive velocity, one for distributed clutter with negative velocity, and one for ground clutter) is retrieved periodically, as circumstances change, and used to form the overall covariance matrix R.

In one embodiment, the calculation of weights is performed according to a method exemplified by the MATLAB™ code of Listing 1.

Listing 1

```
1  For single pulse excision
2
3  %%%3-29-15 failed_pulse=11
4  failed_pulse=11
5
6  % Create Complex Matrix rn
7  rn=rnr+j*rni;
8  % Compute Steering Vector
9  clear i;
10 i=0:1:nc-1;
11 U=exp(1j*(-2*pi*fprf*i));
12 %%%2-7-15 Excise failed pulse from rn & U
13 rn(failed_pulse,:)=[ ];
14 rn(:,failed_pulse)=[ ];
15 U(failed_pulse)=[ ];
16 tic;
17 w2=inv(rn)*U.';
18 w2r=real(w2).';
19 w2i=imag(w2).';
20 %%%2-7-15 ADD BACK FAILED_PULSE COEFFICIENT=0
21 wr=[w2r(1:failed_pulse-1) 0 w2r(failed_pulse:end)];
22 wi=[w2i(1:failed_pulse-1) 0 w2i(failed_pulse:end)];
23
24 % Normalize filter coefficients to Specified Noise Gain
25 NGo=0;
26 for j=0:nc-1,
27 NGo=NGo+(wr(j+1)*wr(j+1))+(wi(j+1)*wi(j+1));
28 end
29 alpha=sqrt(Ko/NGo);
30
31 wr=wr*alpha;
32 wi=wi*alpha;
33 toc
34
35
36 For 3-pulse excision
37
38
```

```
39 %%%3-29-15 failed_pulse=5, 11, 19 for 20-pulse
40 failed_pulse=[5 11 19]
41 fp=failed_pulse
42 % Create Complex Matrix rn
43 rn=rnr+j*rni;
44 % Compute Steering Vector
45 clear i;
46 i=0:1:nc-1;
47 U=exp(1j*(-2*pi*fprf*i));
48
49 %%%2-28-15 Excise 3 failed pulse from rn & U
50 %%%2-28-15 failed_pulse array ordered from low to
    high
51 %%%2-28-15 Nulling out covariance matrix rn and
    vector U in high to low
52 %%%order
53 rn(failed_pulse(3),:)=[ ];
54 rn(:,failed_pulse(3))=[ ];
55 U(failed_pulse(3))=[ ];
56
57 rn(failed_pulse(2),:)=[ ];
58 rn(:,failed_pulse(2))=[ ];
59 U(failed_pulse(2))=[ ];
60
61 rn(failed_pulse(1),:)=[ ];
62 rn(:,failed_pulse(1))=[ ];
63 U(failed_pulse(1))=[ ];
64 tic;
65 w2=inv(rn)*U.';
66 w2r=real(w2).';
67 w2i=imag(w2).';
   %%%2-28-15 ADD BACK FAILED_PULSE COEF-
     FICIENT=0 for 3 failed pulses
68 using
69 %%%low to high order
   wr=[w2r(1:fp(1)-1) 0 w2r(fp(1):fp(2)-2) 0 w2r(fp(2)-
     1:fp(3)-3) 0 w2r(fp(3)-
70 2:end)];
71
   wi=[w2i(1:fp(1)-1) 0 w2i(fp(1):fp(2)-2) 0 w2i(fp(2)-1:
     fp(3)-3) 0 w2i(fp(3)-
72 2:end)];
73 % Normalize filter coefficients to Specified Noise Gain
74 NGo=0;
75 for j=0:nc-1,
76 NGo=NGo+(wr(j+1)*wr(j+1))+(wi(j+1)*wi(j+1));
77 end
78 alpha=sqrt(Ko/NGo);
79
80 wr=wr*alpha;
81 wi=wi*alpha;
82 toc
```

In Listing 1, lines 1-33 may be used to find filter weights when one pulse has been corrupted by pulsed interference. In the example of Listing 1, it is the $11^{th}$ pulse that is corrupted, as specified on line 4. In Listing 1, rn is the overall covariance matrix R, U is the progressive phasor vector $\underline{W}_o$, and w2 is the reduced vector of weights. On lines 13-15, the $11^{th}$ row and column (i.e., the row and column corresponding to the corrupted pulse) are excised from the overall covariance, and the $11^{th}$ element is excised from the progressive phasor vector. Equation 1 is evaluated on line 17. On lines 21 and 22, a full length (complex) vector of weights is formed (represented as two real vectors, wr and wi, containing the real and imaginary parts, respectively), by substituting zero for the excised element. In another embodiment the corresponding element may instead be excised from the data vector, and the reduced vector of weights may be multiplied by the reduced return vector. On lines 24-32 the filter weights are normalized so that the modulus of the vector of weights (defined as the square root of the sum of the squares of the moduli of the complex elements of the vector) is equal to a set constant, Ko in Listing 1. This normalization may be used to arrange for the thermal noise to be the same at the output of each filter in the bank of filters.

Similarly, lines 36-82 may be used to find filter weights when three pulses have been corrupted by pulsed interference. In the example of Listing 1, it is the $5^{th}$, $11^{th}$, and $19^{th}$ pulses that are corrupted, as defined on line 40. Line 40 defines a vector including the indices of all of the corrupted pulses, and accordingly the code of lines 36-82 may be employed for an arbitrary set of three corrupted pulses. Lines 70 and 72 are specific to the case of three corrupted pulses; a generalization of these two lines to accommodate an arbitrary number of pulses will be apparent to one of skill in the art. On lines 53-55, the rows and columns corresponding to the corrupted pulses are excised from the overall covariance, and the elements corresponding to the corrupted pulses are excised from the progressive phasor vector. Equation 1 is evaluated on line 65. A full length (complex) vector of weights is formed on lines 70 and 72, by substituting zero for the excised elements. In another embodiment the corresponding elements may instead be excised from the data vector, and the reduced vector of weights may be multiplied by the reduced return vector. On lines 73-81 the filter weights are normalized so that the modulus of the vector of weights (defined as the square root of the sum of the squares of the moduli of the complex elements of the vector) is equal to a set constant, Ko in Listing 1. This normalization may be used to arrange for the thermal noise to be the same at the output of each filter in the bank of filters.

Figure 3:
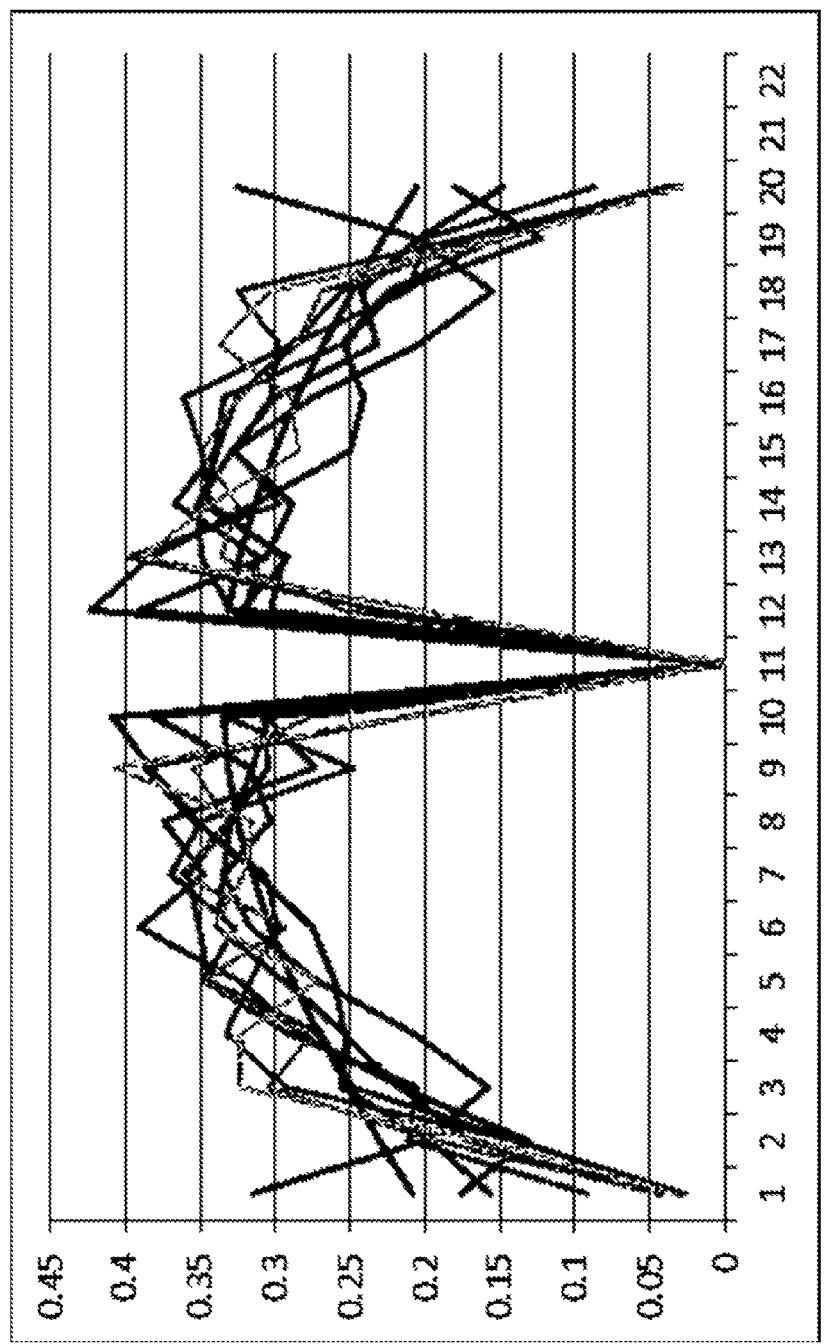
FIG. 3 is a graph of filter weight moduli according to an embodiment of the present invention.
Figure 4:
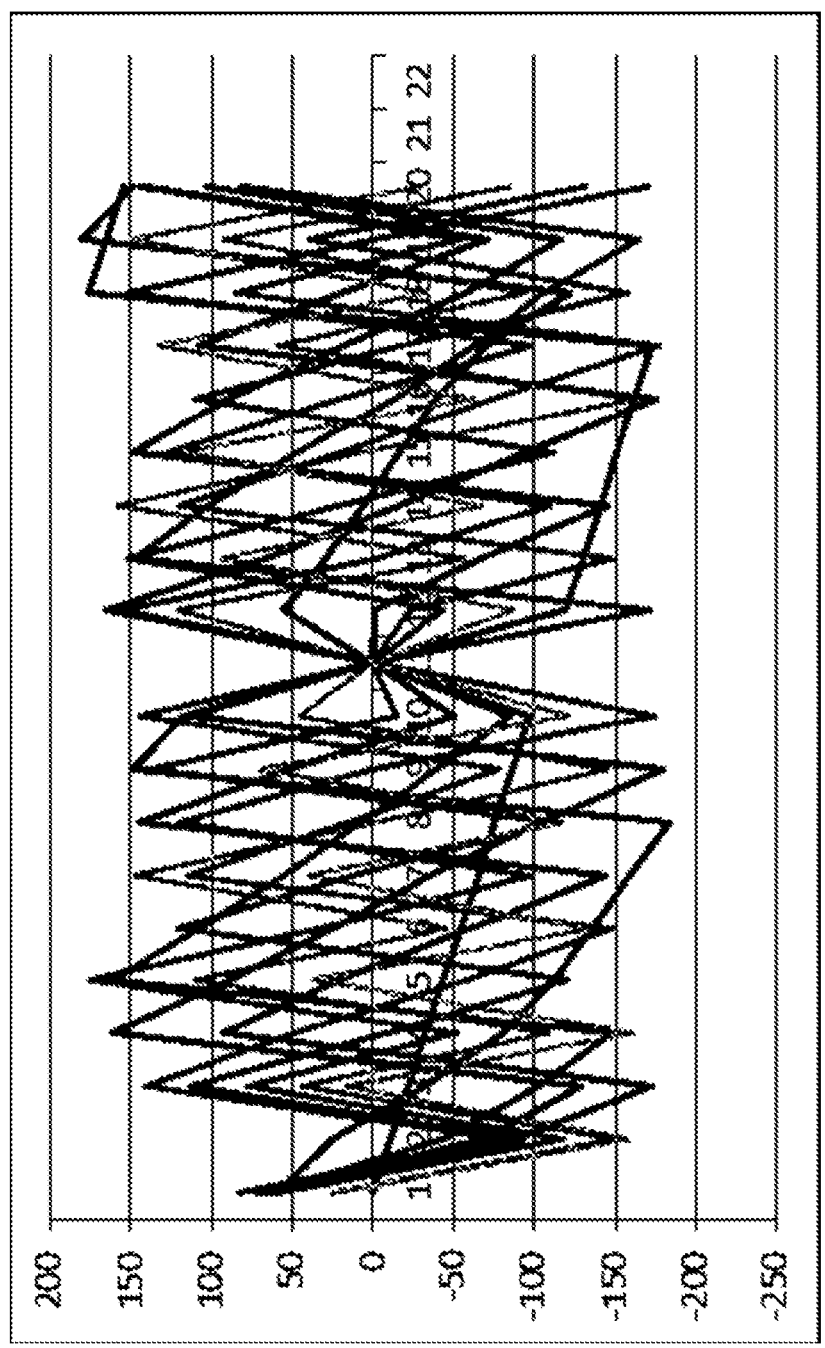
FIG. 4 is a graph of filter weight phases according to an embodiment of the present invention.
Figure 5:
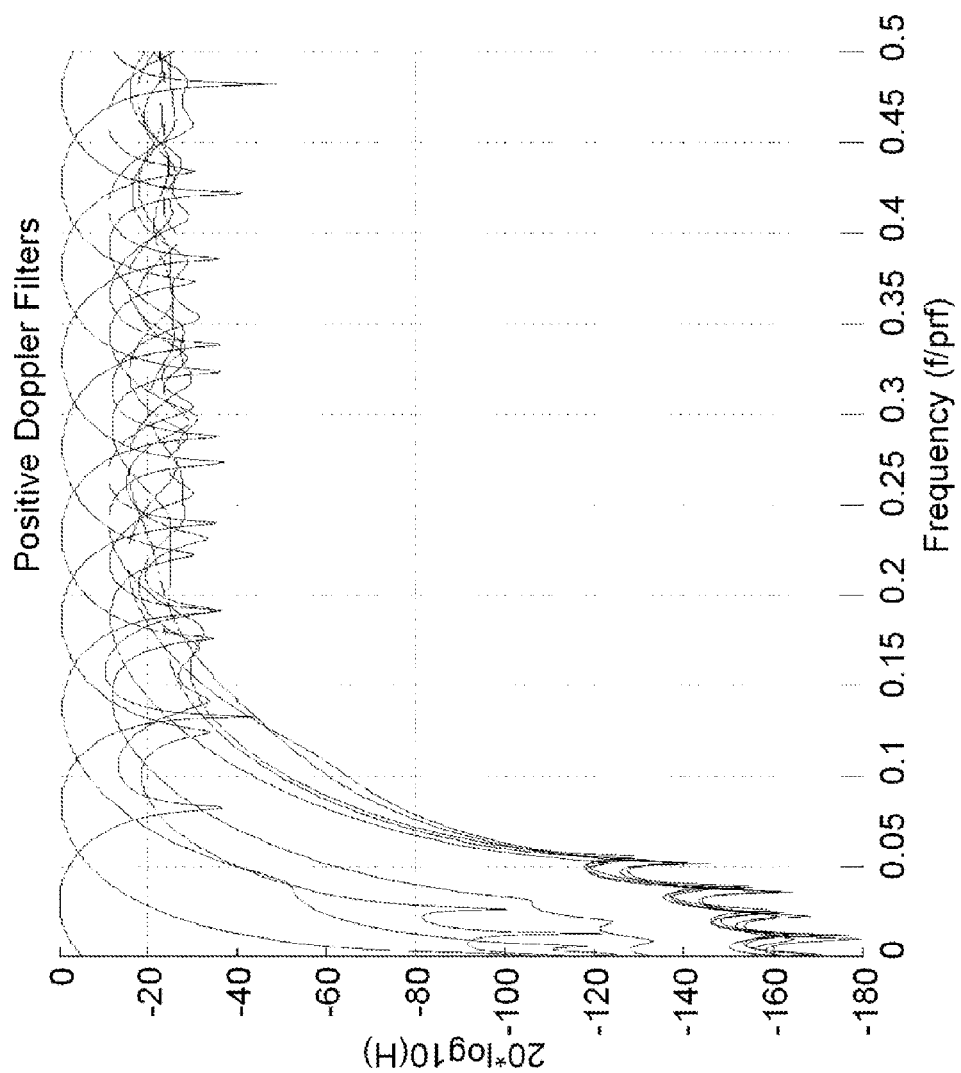
FIG. 5 is a graph of the frequency responses of filters in a bank of Doppler filters according to an embodiment of the present invention.

When Equation 1 is used to find a set of reduced vectors of weights for 20 Doppler filters, for a case in which the $11^{th}$ pulse is corrupted by pulsed interference, the moduli of the elements of the vector of weights may be those shown in FIG. 3, and the phases may be those shown in FIG. 4, where in FIG. 4 the phase of the $11^{th}$ element has arbitrarily been set to 0. The frequency response of a Doppler filter bank using these weights is shown in FIG. 5; it is apparent that the ground clutter cancellation achieved is comparable to that achieved when none of the pulses is corrupted.

Figure 6:
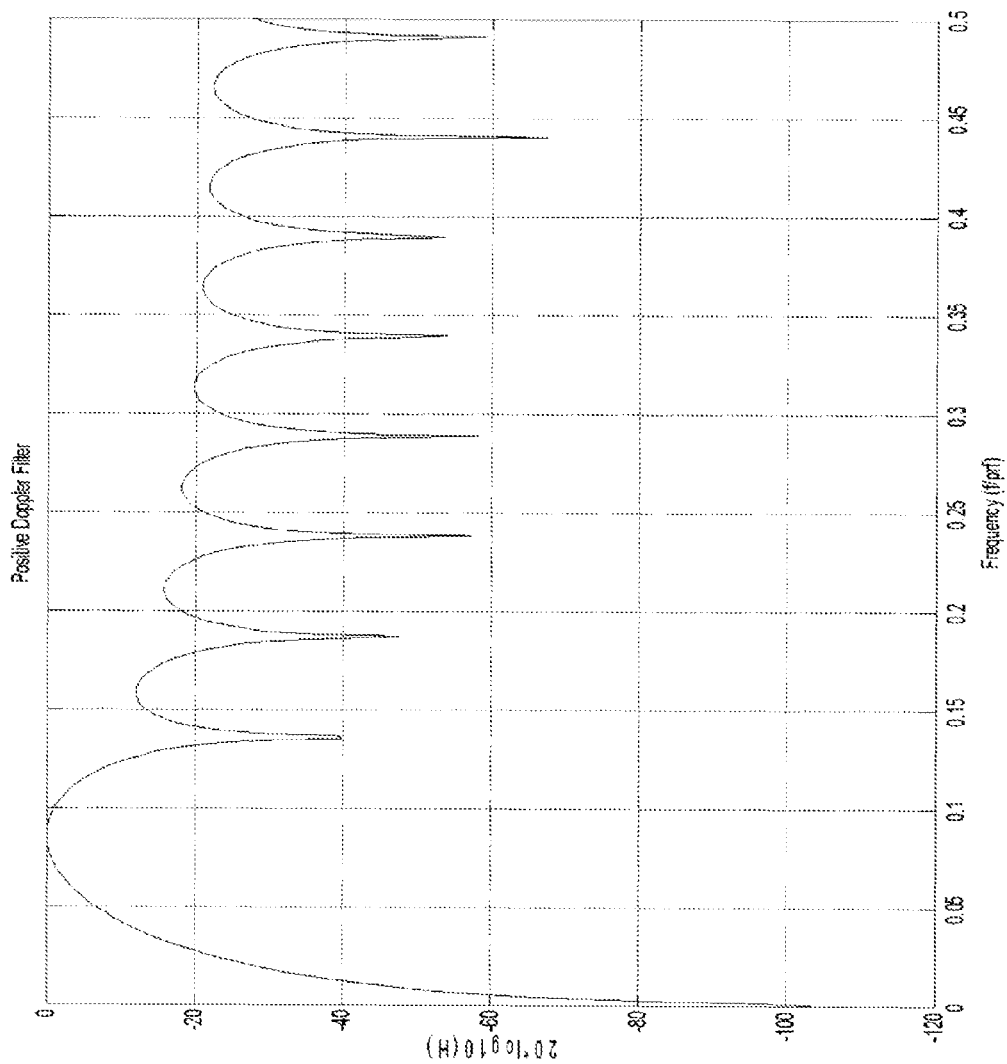
FIG. 6 is a graph of the frequency response of a filter in a bank of Doppler filters according to an embodiment of the present invention.
Figure 7:
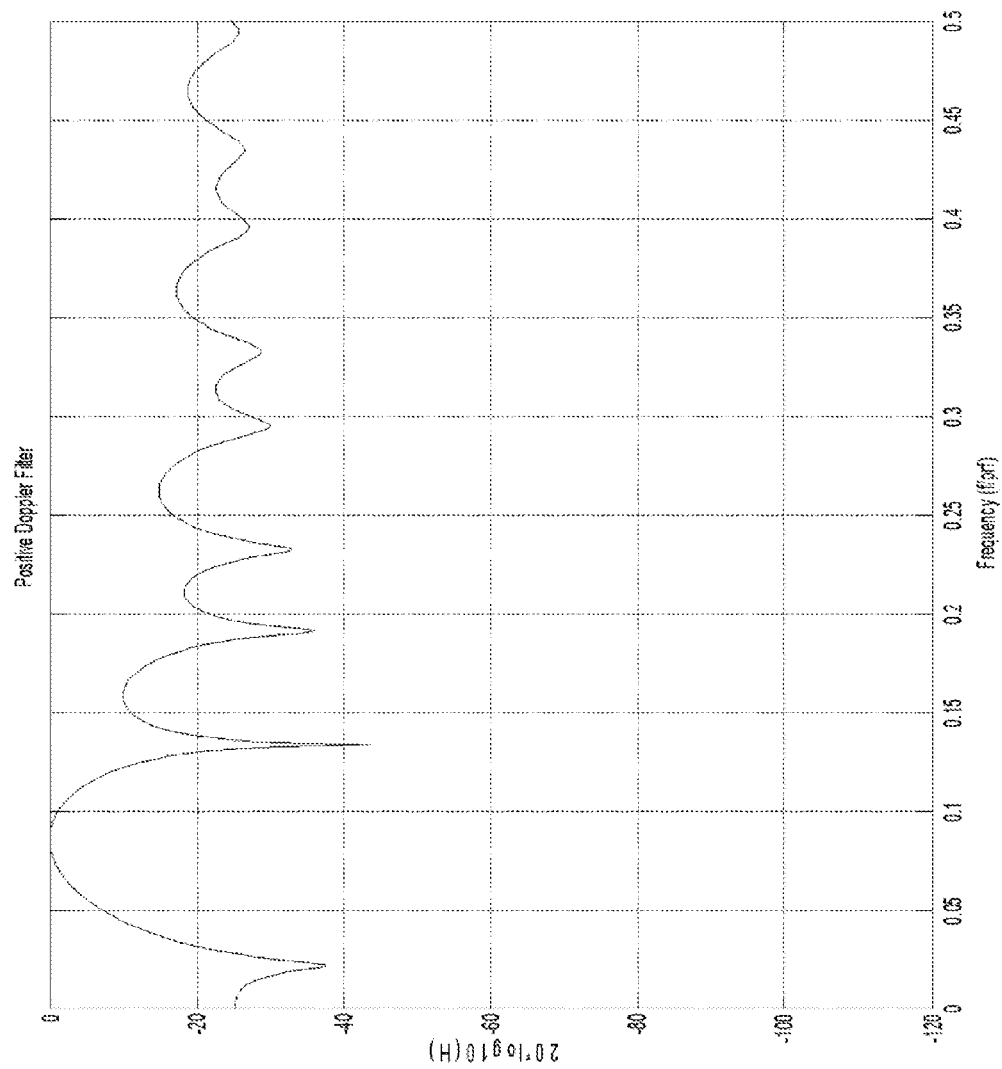
FIG. 7 is a graph of the frequency response of a filter in a bank of Doppler filters according to an embodiment of the present invention.
Figure 8:
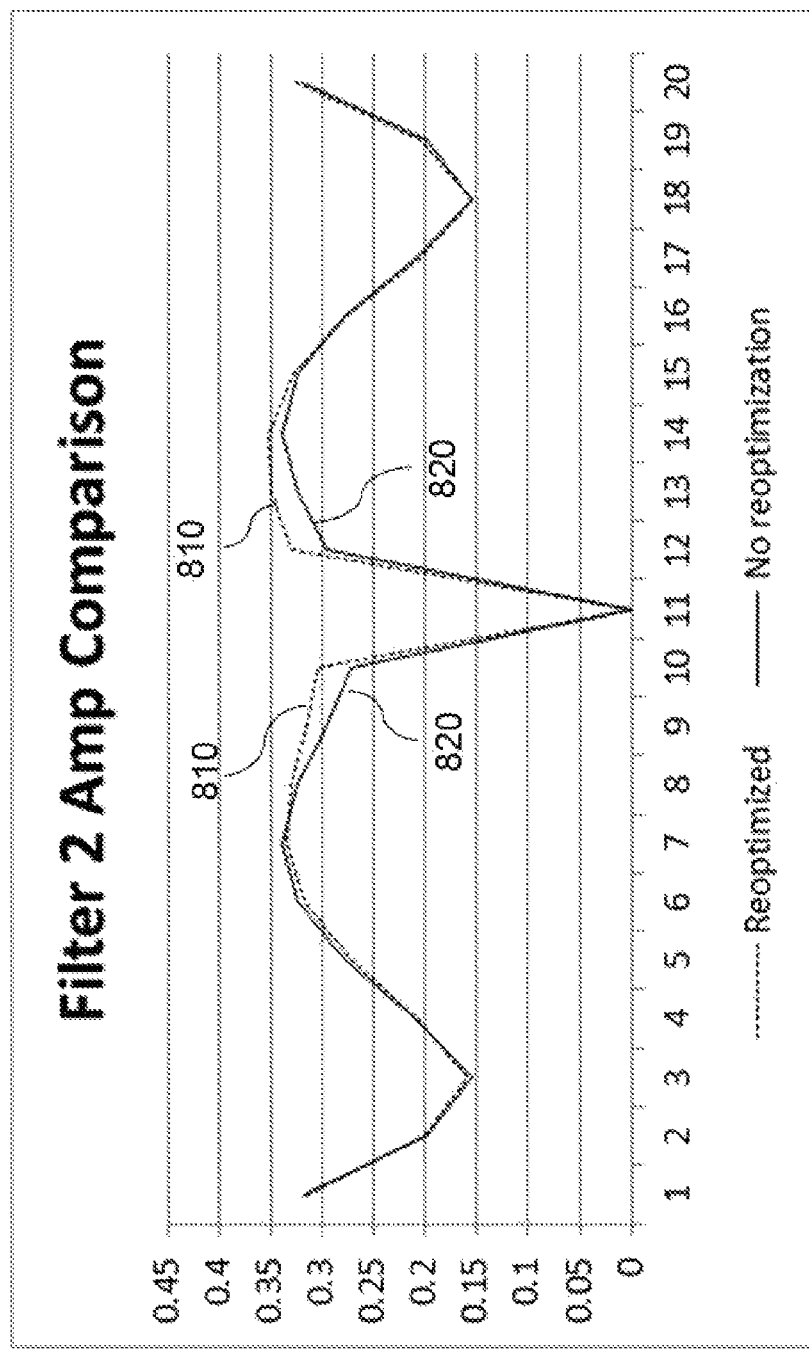
FIG. 8 is a graph of filter weight moduli according to an embodiment of the present invention.
Figure 9:
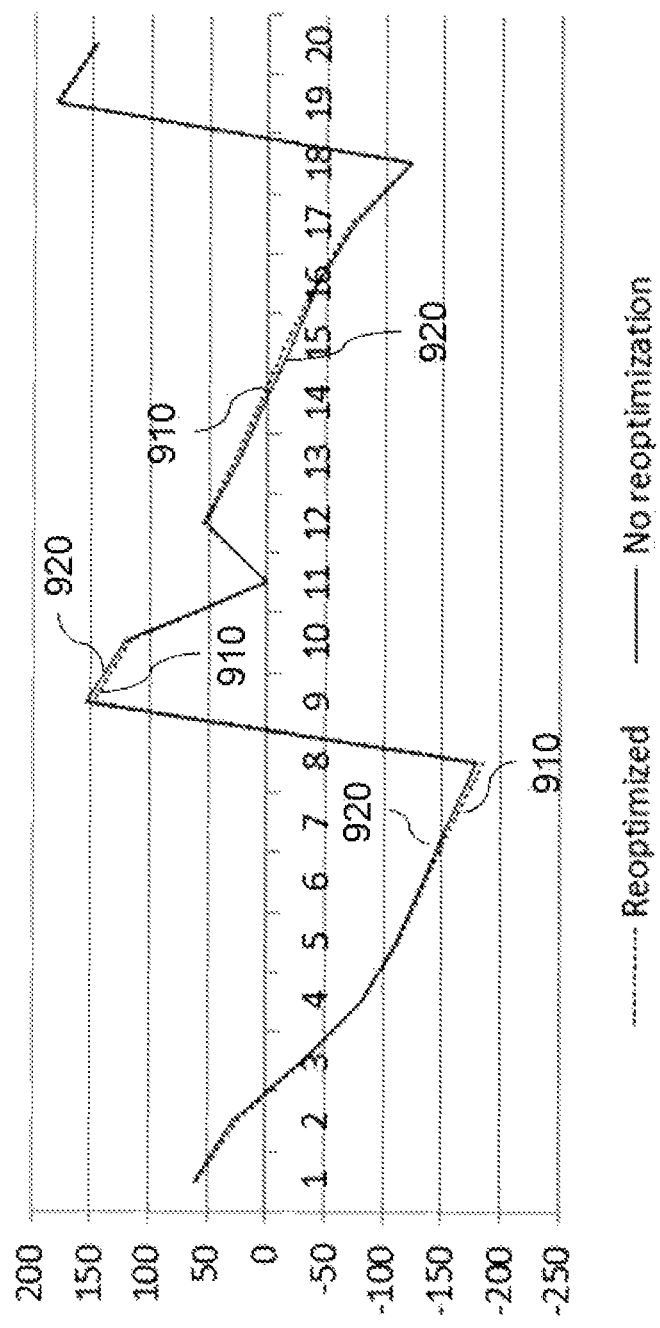
FIG. 9 is a graph of filter weight phases according to an embodiment of the present invention.
Figure 10:
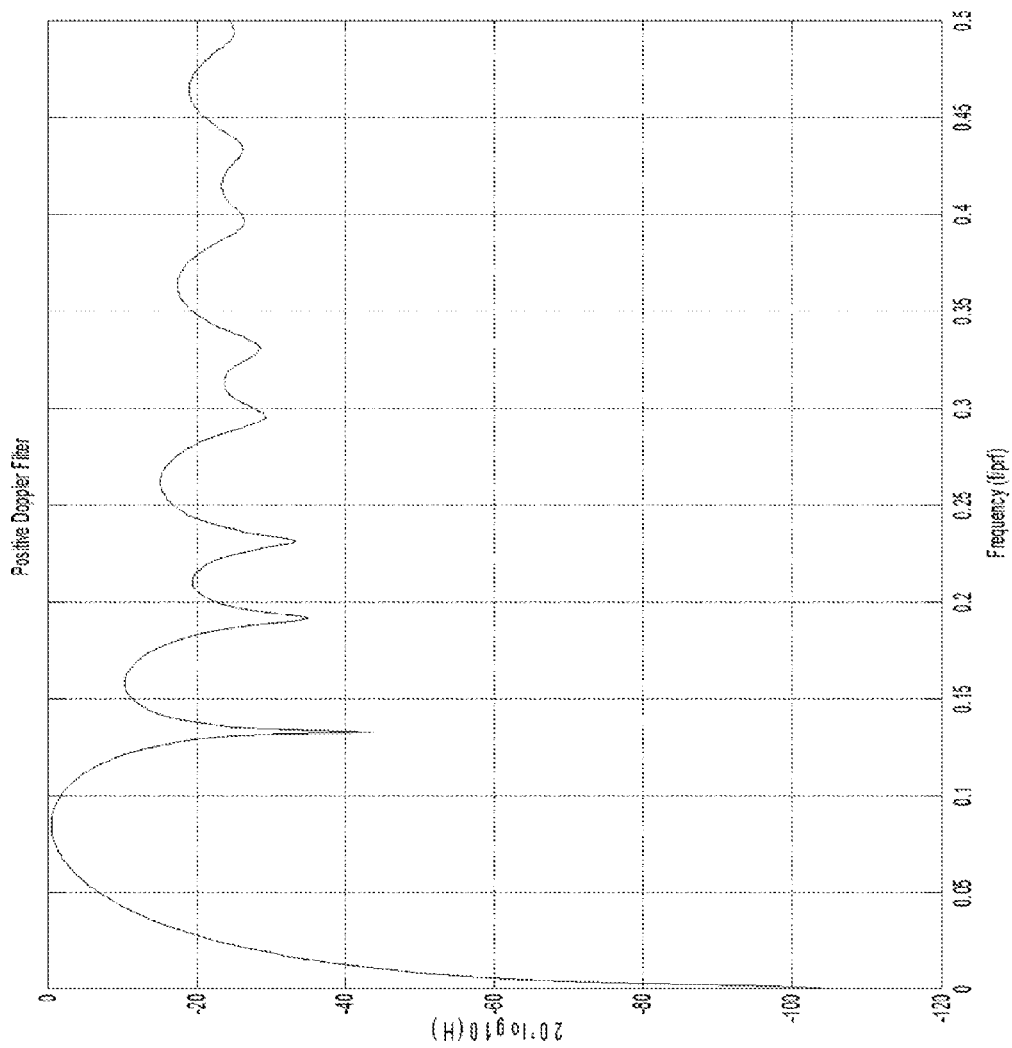
FIG. 10 is a graph of the frequency response of a filter in a bank of Doppler filters according to an embodiment of the present invention.

FIG. 6 shows the frequency response of the positive number 2 filter when a vector of weights is calculated using Equation 1 without any pulses being corrupted (i.e., with no rows, columns, or elements excised). FIG. 7 shows, for comparison, the effect of setting to zero the $11^{th}$ weight of the positive number 2 filter without re-calculating the weights; it is apparent that the ground clutter cancellation is largely lost. When Equation 1 is used to find the weights for this filter with the $11^{th}$ element excised, the moduli of the elements of the vector of weights may be those shown as curve 810 in FIG. 8 (with the weights corresponding to FIG. 7 shown as curve 820) and the phases may be those shown as curve 910 in FIG. 9 (with the phases corresponding to FIG. 7 shown as curve 920). In FIG. 9 the phase of the $11^{th}$ element has arbitrarily been set to 0. The frequency response of the positive number 2 filter using weights calculated using Equation 1, with the $11^{th}$ element excised, is shown in FIG. 10. It is apparent that significant ground clutter cancellation is provided by this filter.

Figure 11:
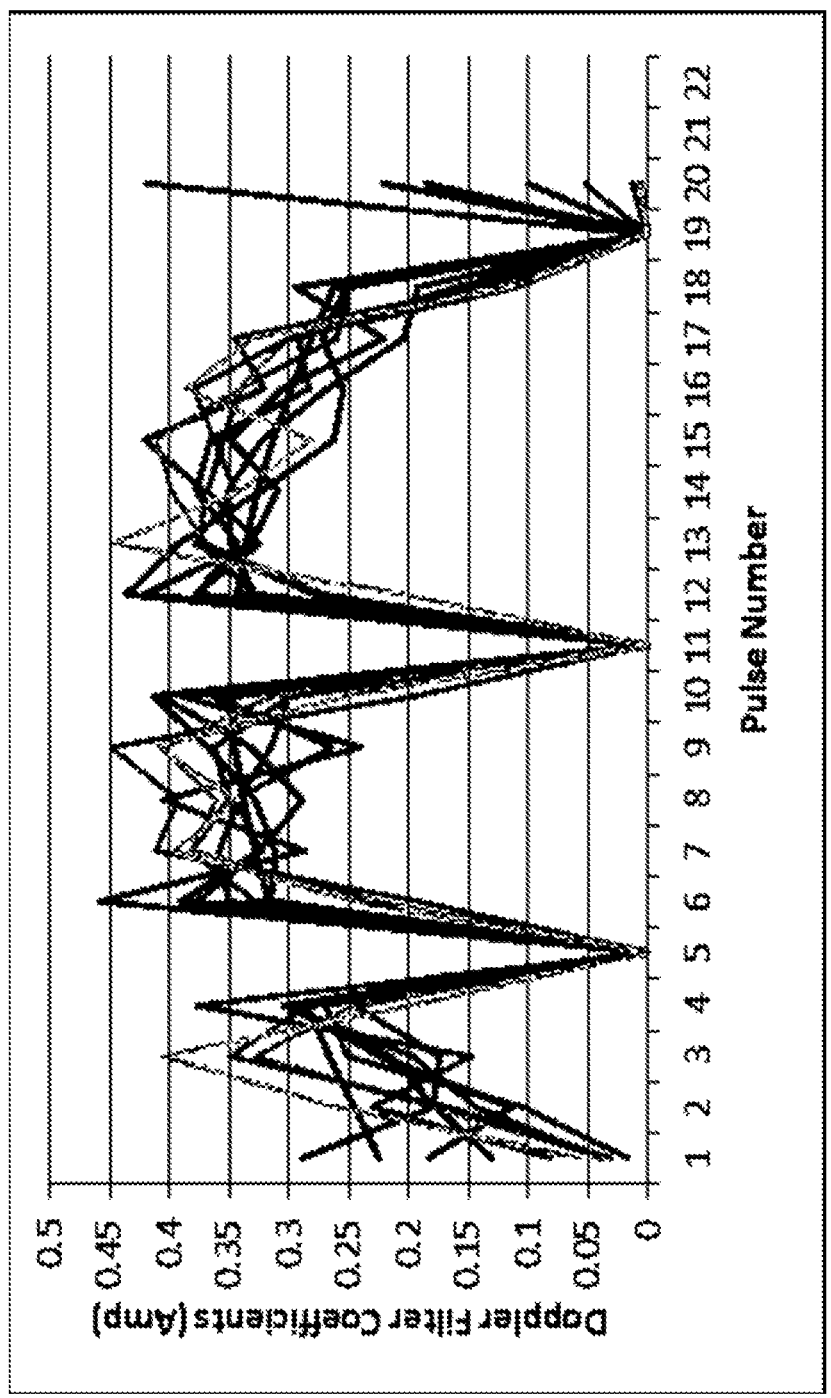
FIG. 11 is a graph of filter weight moduli according to an embodiment of the present invention.
Figure 12:
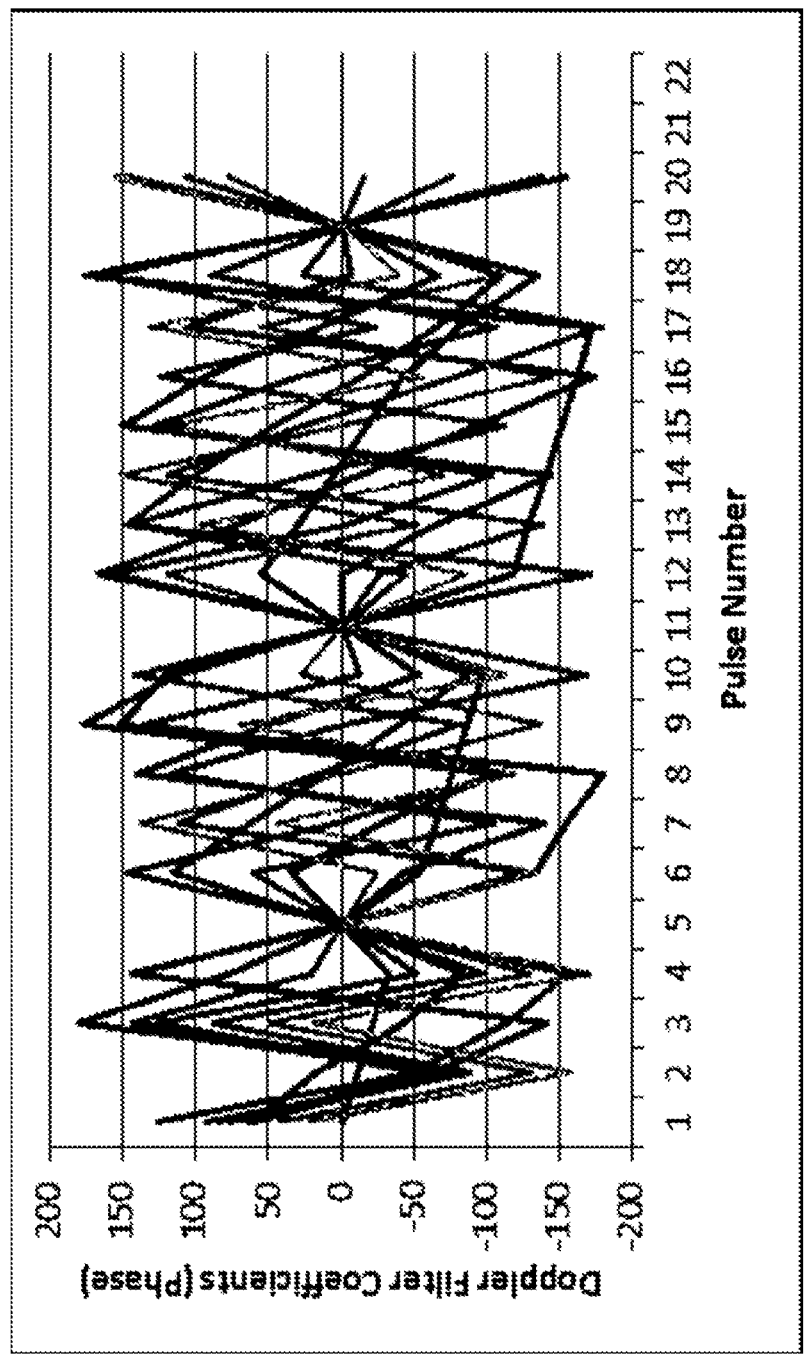
FIG. 12 is a graph of filter weight phases according to an embodiment of the present invention.
Figure 13:
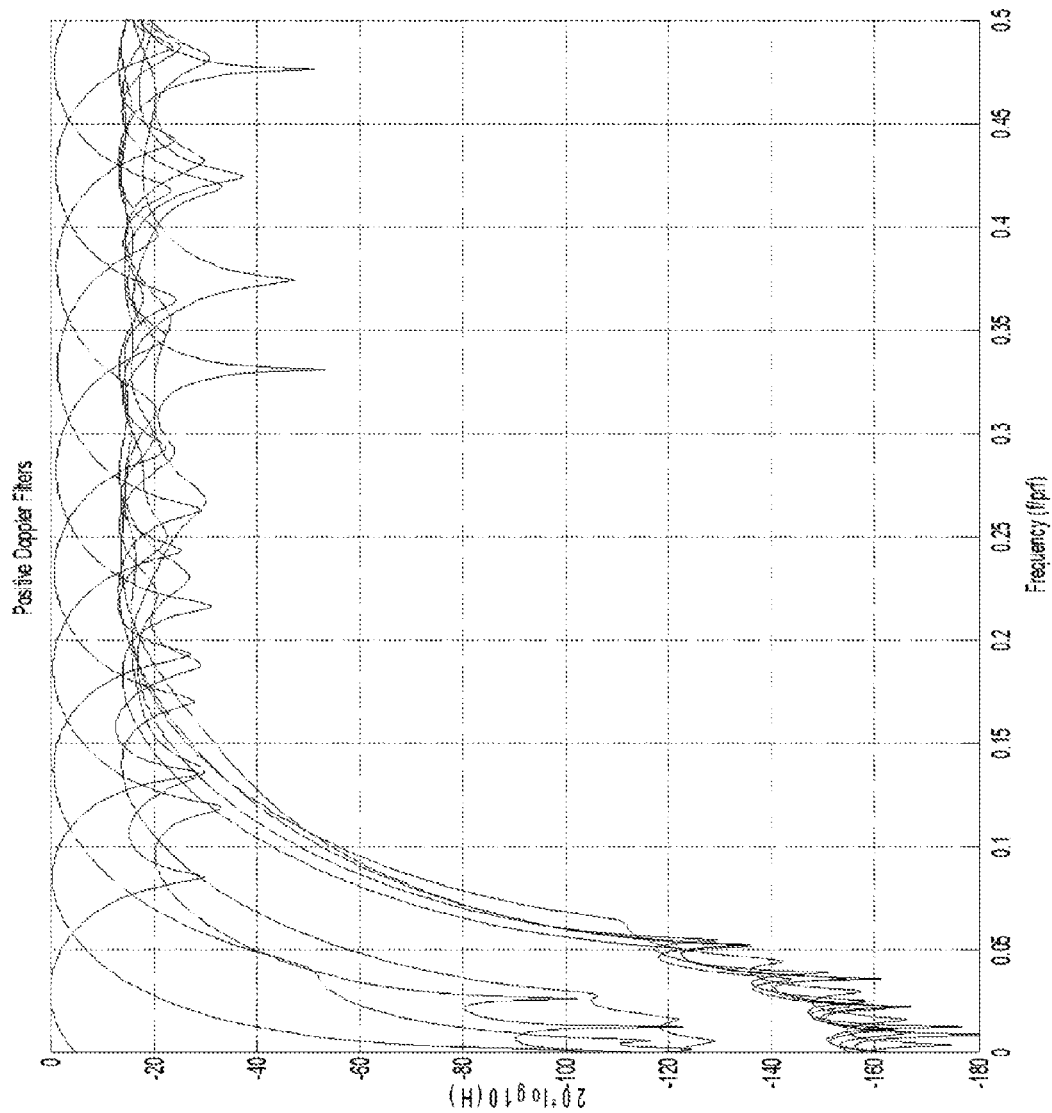
FIG. 13 is a graph of the frequency responses of filters in a bank of Doppler filters according to an embodiment of the present invention.

When Equation 1 is used to find a set of reduced vectors of weights for 20 Doppler filters, for a case in which the $5^{th}$, $11^{th}$, and $19^{th}$ pulses are corrupted by pulsed interference, the moduli of the elements of the vector of weights may be those shown in FIG. 11, and the phases may be those shown in FIG. 12, where in FIG. 12 the phase of the $5^{th}$, $11^{th}$, and $19^{th}$ elements has arbitrarily been set to 0. The frequency response of a Doppler filter bank using these weights is shown in FIG. 13; it is apparent that the ground clutter cancellation achieved is comparable to that achieved when none of the pulses is corrupted.

During a dwell, whether return data has been corrupted by pulsed interference may be detected by testing whether the output of the ADC exceeds a set threshold or whether the ADC is saturated (i.e., the value exceeds a threshold corresponding to the range of the ADC). The receiver may include a circuit for detecting such corruption and may communicate to the processing module which return data are corrupted.

Figure 14:
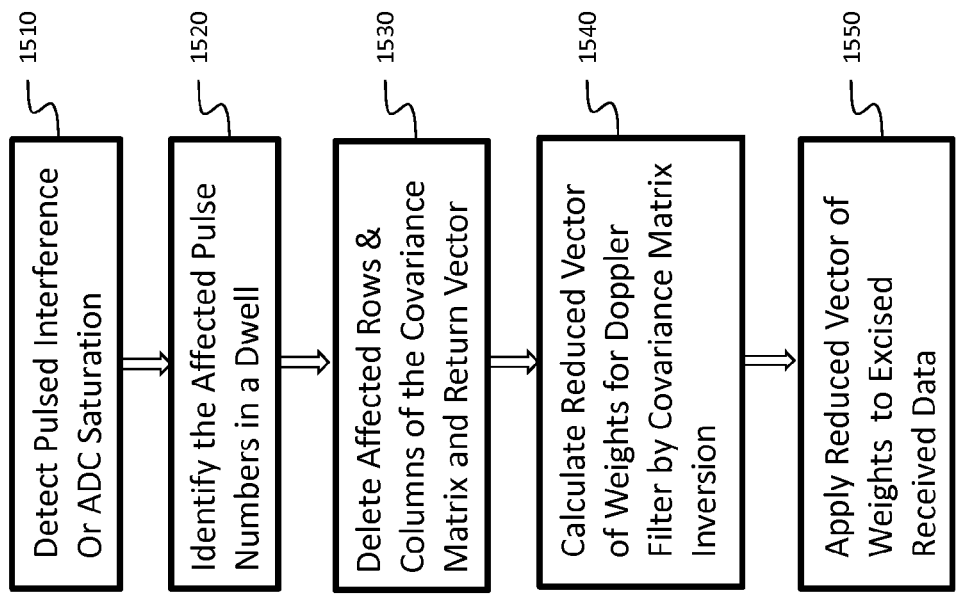
FIG. 14 is a flowchart of a method for mitigating pulsed interference according to an embodiment of the present invention.

Referring to FIG. 14, in one embodiment a method for processing radar returns includes: in an act 1510, detecting pulsed interference or ADC saturation, in an act 1520 identifying the affected pulse numbers in a dwell, in an act 1530 deleting affected rows and columns of the covariance matrix and return vector, in an act 1540 re-calculating Doppler filter coefficients by the covariance matrix inversion method of Equation 1, and in an act 1550 re-applying the re-calculated Doppler filter coefficients to excised the reduced return vector.

The term "processing module" is used herein to include any combination of hardware, firmware, and software, employed to process data or digital signals. Processing module hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing module, as used herein, each function is performed either by hardware configured, i.e., hard-wired, to perform that function, or by more general purpose hardware, such as a CPU, configured to execute instructions stored in a non-transitory storage medium. A processing module may be fabricated on a single printed wiring board (PWB) or distributed over several interconnected PWBs. A processing module may contain other processing modules; for example a processing module may include two processing modules, an FPGA and a CPU, interconnected on a PWB.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of an adaptive Doppler filter re-optimization method for pulsed interference countermeasure have been specifically described and illustrated herein, many modifications and variations will be apparent to those skilled in the art. Accordingly, it is to be understood that an adaptive Doppler filter re-optimization method for pulsed interference countermeasure employed according to principles of this invention may be embodied other than as specifically described herein. The invention is also defined in the following claims, and equivalents thereof.

What is claimed is:

1. A method for operating a range-gated Doppler radar in the presence of pulsed interference, the method comprising:
   receiving, with a radar antenna, reflected radar radiation;
   processing the received reflected radar radiation with a radar front-end processor to form a return vector, the return vector being a vector of range-gated radar returns;
   identifying the index k of an element, of the return vector, corrupted by pulsed interference;
   forming a first reduced progressive phasor vector, equal to the result of removing at least the $k^{th}$ element from a first full progressive phasor vector, the first full progressive phasor vector being a vector of complex numbers, the arguments of the elements of the first full progressive phasor vector being a linear function of their respective positions in the first full progressive phasor vector, the linear function having a slope proportional to a center frequency of a first Doppler filter;
   forming a reduced-rank overall covariance matrix equal to the result of removing at least the $k^{th}$ row and at least the $k^{th}$ column from a full-rank overall covariance matrix, the full-rank overall covariance matrix being equal to an identity matrix plus a weighted sum of one or more specific covariance matrices including a specific covariance matrix for ground clutter; and
   calculating a first reduced vector of weights for the first Doppler filter, the matrix product of the reduced overall covariance matrix and the first reduced vector of weights being equal to the first reduced progressive phasor vector.

2. The method of claim 1, further comprising multiplying the first reduced vector of weights, in a dot product, by a reduced return vector, the reduced return vector being equal to the result of removing at least the $k^{th}$ element from the return vector.

3. The method of claim 1, further comprising forming a full vector of weights by inserting a zero element in the first reduced vector of weights at each of one or more positions corresponding to positions at which elements were removed from the first full phasor vector to form the first reduced phasor vector.

4. The method of claim 3, further comprising multiplying the full vector of weights, in a dot product, by the return vector.

5. The method of claim 1, further comprising forming a normalized reduced vector of weights proportional to the first reduced vector of weights, the sum of the squares of the moduli of the elements of the normalized reduced vector of weights being equal to a set constant.

6. The method of claim 1, wherein all elements of the first full phasor vector have the same modulus.

7. The method of claim 6, wherein all elements of the first full phasor vector have a modulus of 1.

8. The method of claim 1, further comprising:
forming a second reduced progressive phasor vector, equal to the result of removing at least the $k^{th}$ element from a second full progressive phasor vector, the second full progressive phasor vector being a vector of complex numbers, the arguments of the elements of the second full progressive phasor vector being a linear function of their respective positions in the second full progressive phasor vector, the linear function having a slope proportional to a center frequency of a second Doppler filter; and
calculating a second reduced vector of weights for the second Doppler filter, the matrix product of the reduced overall covariance matrix and the second reduced vector of weights being equal to the second reduced progressive phasor vector.

9. The method of claim 1, wherein the calculating of the first reduced vector of weights comprises calculating the inverse of the reduced overall covariance matrix.

10. The method of claim 9, wherein the calculating of the inverse of the reduced overall covariance matrix comprises forming a lower-upper (LU) decomposition of the reduced overall covariance matrix.

11. The method of claim 1, wherein the overall covariance matrix is equal to the weighted sum of:
an identity matrix;
a first specific covariance matrix;
a second specific covariance matrix; and
a third specific covariance matrix,
wherein the first specific covariance matrix, the second specific covariance matrix, and the third specific covariance matrix are weighted with a first tuning parameter, a second tuning parameter, and a third tuning parameter, respectively.

12. The method of claim 11 wherein:
the first specific covariance matrix corresponds to distributed clutter with positive velocity;
the second specific covariance matrix corresponds to distributed clutter with negative velocity; and
the third specific covariance matrix corresponds to ground clutter.

13. A range-gated Doppler radar system comprising:
a radar antenna;
a radar transmitter connected to the radar antenna;
a radar receiver connected to the radar antenna; and
a processing module connected to the radar receiver and configured to:
receive, from the receiver, a return vector, the return vector being a vector of range-gated radar returns;
identify the index k of an element, of the return vector, corrupted by pulsed interference;
form a first reduced progressive phasor vector, equal to the result of removing at least the $k^{th}$ element from a first full progressive phasor vector, the first full progressive phasor vector being a vector of complex numbers, the arguments of the elements of the first full progressive phasor vector being a linear function of their respective positions in the first full progressive phasor vector, the linear function having a slope proportional to a center frequency of a first Doppler filter;
form a reduced-rank overall covariance matrix equal to the result of removing at least the $k^{th}$ row and at least the $k^{th}$ column from a full-rank overall covariance matrix, the full-rank overall covariance matrix being equal to an identity matrix plus a weighted sum of one or more specific covariance matrices including a specific covariance matrix for ground clutter; and
calculate a first reduced vector of weights for the first Doppler filter, the matrix product of the reduced overall covariance matrix and the first reduced vector of weights being equal to the first reduced progressive phasor vector.

14. The system of claim 13, wherein the processing module is further configured to multiply the first reduced vector of weights, in a dot product, by a reduced return vector, the reduced return vector being equal to the result of removing at least the $k^{th}$ element from the return vector.

15. The system of claim 13, wherein all elements of the first full progressive phasor vector have the same modulus.

16. The system of claim 15, wherein all elements of the first full progressive phasor vector have a modulus of 1.

17. The system of claim 13, wherein the processing module is further configured to:
form a second reduced progressive phasor vector, equal to the result of removing at least the $k^{th}$ element from a second full progressive phasor vector, the second full progressive phasor vector being a vector of complex numbers, the arguments of the elements of the second full progressive phasor vector being a linear function of their respective positions in the second full progressive phasor vector, the linear function having a slope proportional to a center frequency of a second Doppler filter; and
calculate a second reduced vector of weights for the second Doppler filter, the matrix product of the reduced overall covariance matrix and the second reduced vector of weights being equal to the second reduced progressive phasor vector.

* * * * *